US008551645B2

(12) United States Patent
Hyung et al.

(10) Patent No.: US 8,551,645 B2
(45) Date of Patent: Oct. 8, 2013

(54) CAN FOR CYLINDRICAL LITHIUM RECHARGEABLE BATTERY AND CYLINDRICAL LITHIUM RECHARGEABLE BATTERY USING THE SAME

(75) Inventors: Yooeup Hyung, Yongin-si (KR); Chanwoo Park, Yongin-si (KR); Sunhee Bang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1371 days.

(21) Appl. No.: 11/676,086

(22) Filed: Feb. 16, 2007

(65) Prior Publication Data

US 2007/0196731 A1   Aug. 23, 2007

(30) Foreign Application Priority Data

Feb. 20, 2006   (KR) ................. 10-2006-16096

(51) Int. Cl.
   H01M 2/02   (2006.01)
   H01M 2/04   (2006.01)
   H01M 4/02   (2006.01)
   H01M 4/13   (2010.01)
   H01M 4/58   (2010.01)

(52) U.S. Cl.
   USPC ........... 429/176; 429/164; 429/178; 429/179; 429/211; 429/231.95

(58) Field of Classification Search
   USPC ............ 429/178–179, 164, 176, 211, 231.95
   See application file for complete search history.

(56) References Cited

U.S. PATENT DOCUMENTS

| 2002/0034680 A1 * | 3/2002 | Inoue et al. .................. 429/94 |
| 2004/0023107 A1 | 2/2004 | Nakanishi et al. |
| 2005/0118507 A1 * | 6/2005 | Guterman et al. ........ 429/231.95 |
| 2005/0158620 A1 * | 7/2005 | Kim et al. .................. 429/161 |
| 2005/0260489 A1 * | 11/2005 | Kim ............................... 429/122 |
| 2006/0040179 A1 * | 2/2006 | Bang ............................ 429/178 |
| 2007/0020518 A1 * | 1/2007 | Bito et al. .................... 429/181 |

FOREIGN PATENT DOCUMENTS

| JP | 2000-133243 | 5/2000 |
| JP | 2003-217527 | 7/2003 |
| JP | 2005-093186 | 4/2005 |
| KR | 10-1997-0054691 | 7/1997 |
| WO | WO 00/39868 | 7/2000 |
| WO | WO-2005/020351 | * 3/2005 |

OTHER PUBLICATIONS

Patent Abstracts of Japan and English machine translation of Japanese Publication 2000-133243 listed above.
Patent Abstracts of Japan and English machine translation of Japanese Publication 2005-093186 listed above.

* cited by examiner

Primary Examiner — Eugenia Wang
(74) Attorney, Agent, or Firm — Christie, Parker & Hale, LLP

(57) ABSTRACT

A can for a cylindrical lithium rechargeable battery, and a cylindrical lithium rechargeable battery using the same is provided. The battery includes: an electrode assembly having cathode and anode plates facing to each other, a separator interposed between the cathode and anode plates, and cathode and anode taps formed on the cathode and anode plates, respectively; a can accommodating the electrode assembly; and a cap assembly to seal an opening of an upper end portion of the can. The can has surface plate and a lower plate, and a protrusion is formed on the lower plate so as to increase the contact resistance between the anode tap and the lower plate, when the anode tap is welded to the lower plate.

21 Claims, 7 Drawing Sheets

CAN FOR CYLINDRICAL LITHIUM RECHARGEABLE BATTERY AND CYLINDRICAL LITHIUM RECHARGEABLE BATTERY USING THE SAME

CROSS-REFERENCE TO RELATED APPLICATIONS

This application claims the benefit of Korean Application No. 2006-16096, filed Feb. 20, 2006, in the Korean Intellectual Property Office, the disclosure of which is incorporated herein by reference.

BACKGROUND OF THE INVENTION

1. Field of the Invention

Aspects of the present invention relate to a can for a cylindrical lithium rechargeable battery, and a cylindrical lithium rechargeable battery using the same.

2. Description of the Related Art

Generally, the need for weight-reduction and high performance in wireless portable devices, such as, camcorders, cellular phones, notebook computers, and others, has led to research into secondary batteries used as power supplies. Such secondary batteries include nickel-cadmium batteries, nickel-hydrogen batteries, nickel-zinc batteries, lithium secondary batteries, and others. In particular, lithium secondary batteries can be recharged, and are capable of realizing a size-reduction and a high capacity. Since lithium secondary batteries have a high operating voltage and a high energy density per unit weight, they are widely used in high-tech electronics.

FIG. 1 is a vertical-sectional diagram illustrating a related art cylindrical lithium rechargeable battery.

Referring to FIG. 1, the cylindrical lithium rechargeable battery 100 includes an electrode assembly 110, a cylindrical can 130 which accommodates the electrode assembly 110 and an electrolyte solution, and a cap assembly 150 that is assembled on the upper portion of the cylindrical can 130, so as to seal the same, and allows an electric current generated in the electrode assembly 110 to flow out of the device.

The electrode assembly 110 is formed by winding a cathode plate 112 in which the surface of a cathode collector is coated with a cathode active material, an anode plate 114 in which the surface of an anode collector is coated with an anode active material, and a separator 113 which is interposed between the cathode plate 112 and the anode plate 114 to provide an electrical insulation therefore, into a jelly-roll type configuration. Although not shown in the drawing, the cathode plate 112 includes a cathode collector made of a thin metal sheet with an excellent electric conductivity, such as, an aluminum (Al) foil, and a cathode active material layer coated on both surfaces thereof. A cathode collector region without a cathode active material layer, that is, a cathode uncoated portion, is formed at both ends of the cathode plate 112. One end of the cathode uncoated portion is attached with a cathode tap 116, which is generally made of an aluminum (Al) material, that extends a predetermined amount above the electrode assembly 110. Further, the anode plate 114 includes an anode collector made of a thin conductive metal sheet, such as, a copper (Cu) or nickel (Ni) foil, and an anode active material layer coated on both surfaces thereof. An anode collector region without an anode active material layer, that is, an anode uncoated portion, is formed at both ends of the anode plate 114. One end of the anode uncoated portion is attached to an anode tap 118, which is generally made of a nickel (Ni) material, and extends a predetermined amount below the electrode assembly 110. In addition, insulation plates 122 and 124 may be further formed on the upper and lower portions of the electrode assembly 110, in order to prevent each thereof from contacting the cap assembly 150, or the cylindrical can 130.

The cylindrical can 130 includes a cylindrical surface plate 142, with a predetermined diameter to accommodate the cylindrical electrode assembly 110, and a lower plate 131 to seal a lower portion of the cylindrical surface plate 142. An upper end portion of the cylindrical surface plate 142 has an opening through which the electrode assembly 110 is inserted.

The anode tap 118 is attached to the center of the lower plate 131 of the cylindrical can 130 so that the cylindrical can 130 acts as an anode. The cylindrical can 130 is generally made of aluminum (Al), iron (Fe), or an alloy thereof. Additionally, the cylindrical can 130 includes a clipping portion 146, which is bent inwardly from an upper end, so as to pressurize an upper portion of the cap assembly 146, when attached to the opening formed on the upper end thereof. Further, the cylindrical can 130 includes a beading portion 144, which is recessed inwardly, at a position apart from a lower portion of the clipping portion 146, by a distance corresponding to the thickness of the cap assembly 150, so as to pressurize a lower portion of the cap assembly 150.

The cap assembly 150 includes a safety vent 152, a current breaker 153, a secondary protection circuit 154, and a cap up 156. The safety vent 152 is formed into a plate shape, and placed at the lower portion of the cap assembly 150. The safety vent 152 has a central protrusion that curves down toward the electrode assembly 110. Herein, the curvature of the protrusion can be reversed by pressure generated from the inside of a rechargeable battery.

An anode tap 118 extends from the anode plate 114 to the lower plate 131. A cathode tap 116 extends from the cathode plate 112, and is welded to a predetermined position of a lower surface of the safety vent 152, so that the safety vent 152 and the cathode plate 112 of the electrode assembly 110 are electrically coupled to each other. The anode plate 114 is electrically coupled to the can 130, either via a tab (not shown) or by a direct connection method.

Generally, the anode tap 118 is welded to approximately the middle of the lower plate 131 of the can 130 by resistance welding. The welding is performed by inserting a first welding rod into the middle of the electrode assembly, so as to contact the anode tap 118. A second welding rod contacts a bottom surface of the lower plate 131, and then electric current is applied thereto. An electric current is applied to a plurality of conductors that contact each other, and heat is generated due to contact resistance, and such heat causes a welding of the conductors to occur. A large amount of the heat generation occurs in the contact region of the conductors, as the contact resistance is high. Such contact resistance is inversely proportional to the size of the contact region thereof.

However, since both of the anode tap 118 and the lower plate 131, according to the related art, are formed with flat surfaces, the contact area thereof is large, leading to a low contact resistance. Therefore, less heat from electricity applied by the welding rod is produced, thereby leading to a poor weld-ability.

SUMMARY OF THE INVENTION

Accordingly, an aspect of the present invention is to provide a can for a cylindrical lithium rechargeable battery, and a cylindrical lithium rechargeable battery using the same, that can be easily welded to an anode tap, by forming a protrusion on a lower plate of the can. The protrusion can increase the contact resistance between the can and an anode tap.

Additional advantages, aspects and features of the invention will be set forth in the description which follows, and will become apparent to those having ordinary skill in the art upon examination of the following, or may be learned from practice of the invention.

According to an aspect of the present invention, there is provided a can for a cylindrical lithium rechargeable battery. The battery includes: an electrode assembly having a cathode and an anode plate facing each other; a separator interposed between the cathode and anode plates; and a cathode and an anode tap formed on the cathode and anode plates, respectively; a can to accommodate the electrode assembly; and a cap assembly to seal an opening of an upper end portion of the can. The can comprises a surface plate and a lower plate, with the lower plate comprising a protrusion formed thereon. The protrusion allows for an improved welding of the anode tap thereto. Further, the protrusion may be formed by embossing a second surface of the lower plate. In some embodiments at least 3 protrusions are formed on the lower plate. Further, the protrusion may have a circular, an oval or a polygonal shaped, vertical cross-section. Further, the protrusion may have a circular, an oval or a polygonal shaped, horizontal cross-section.

The protrusion may be formed by disposing the protrusions into a linear or matrix shape.

The protrusion, or a group of protrusions, may have a length comprising at least 30% of the diameter of the lower plate.

The protrusion, or the group of protrusions, may have a diameter or width of 1.0 mm.

The protrusion may have a height of from 0.05 to 0.2 mm.

The protrusions of a group of protrusions may be spaced apart by at least 1.0 mm.

The group of protrusions may be formed by attaching a group of at least 3 conductive points to a first surface of the lower plate.

The conductive point may be made of a metal or alloy having a higher electric resistance than aluminum metal.

The conductive point may be made of cobalt (Co), iron (Fe), platinum (Pt) or brass.

It is desirable that the conductive point is formed within a diameter of 1.0 mm.

It is desirable that the group of conductive points have a length of at least 30% of the diameter of the lower plate.

The protrusion may be formed into a bar shape by pressing a second surface of the lower plate.

The group of protrusions may be formed with at least 2 bar-shaped protrusions disposed in parallel to each other.

It is desirable that the group of protrusions have a length of at least 30% of the diameter of the lower plate.

It is desirable that width between each bar-shaped protrusion in a group of protrusions be 1.0 mm, or less.

It is desirable that the distance between each bar-shaped protrusion in a group of protrusions be at least 1.0 mm.

The group of protrusions may be formed into a matrix shape of crosswise and lengthwise bar-shaped protrusions.

It is desirable that the lengthwise bar-shaped protrusions have a length of at least 20% of the diameter of the lower plate.

The protrusion may be formed in the middle of the lower plate.

According to another aspect of the present invention, there is provided a cylindrical lithium rechargeable battery, which includes: an electrode assembly having cathode and anode plates facing each other, a separator interposed between the cathode and anode plates, cathode and anode taps formed on the cathode and anode plates, respectively; a can to accommodate the electrode assembly; and a cap assembly to seal an opening of an upper end portion of the can The can comprises a surface plate, and a lower plate. A protrusion is formed on the lower plate in order to facilitate the welding of the anode tap.

The protrusion may have a vertical cross-sectional shape including a circular, an ovoid, or a polygonal shape.

The protrusion may have a horizontal cross-sectional shape including a circular, an ovoid, or a polygonal shape.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2b is a cross-sectional diagram of the can taken along A-A in FIG. 2a;

FIG. 3b is a cross-sectional diagram of the can taken along B-B in FIG. 3a;

FIG. 4b is a cross-sectional diagram of the can taken along C-C in FIG. 4a;

FIG. 5b is a cross-sectional diagram of the can taken along D-D in FIG. 5a;

DETAILED DESCRIPTION OF EXEMPLARY EMBODIMENTS

Figure 1:
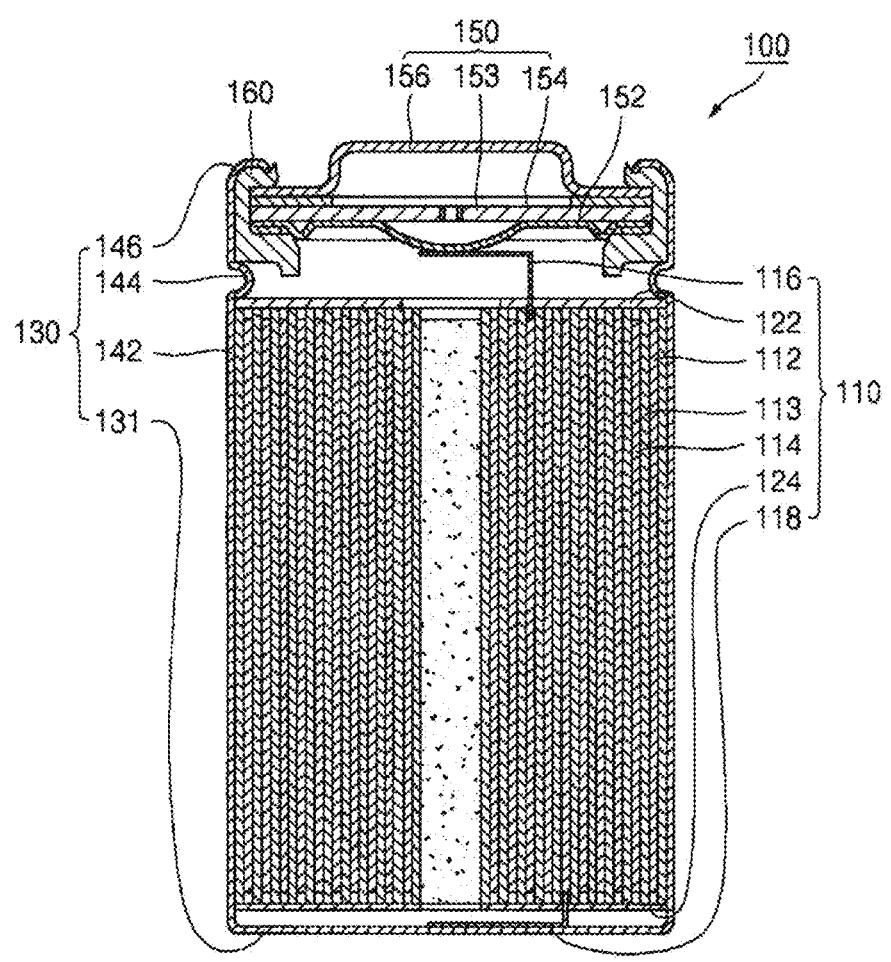
FIG. 1 is a vertical-sectional diagram illustrating a general cylindrical lithium rechargeable battery.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention is not limited to the embodiments disclosed hereinafter, and can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

Figure 2A:
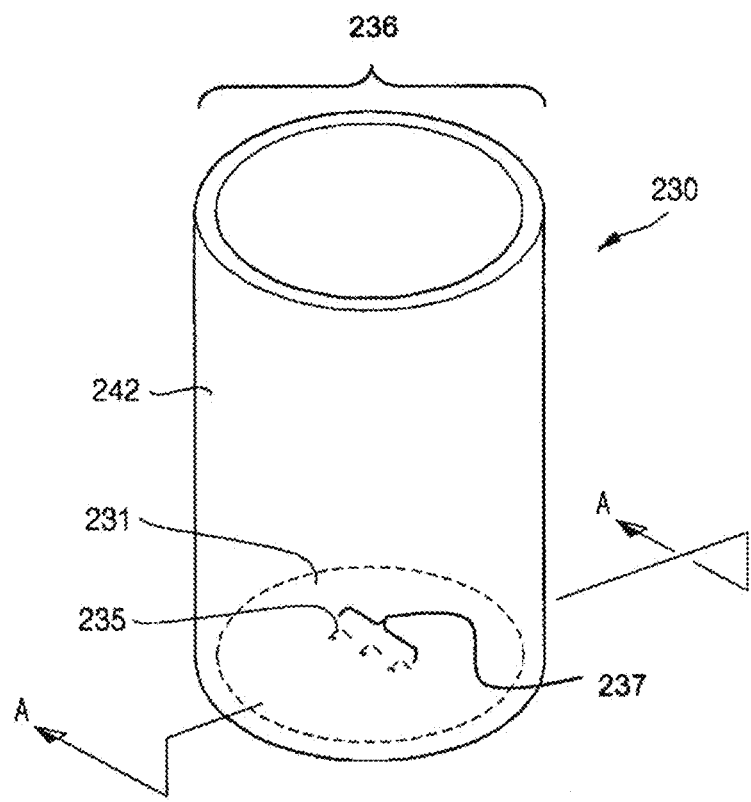
FIG. 2a is a perspective diagram illustrating a can for a cylindrical lithium rechargeable battery according to one embodiment of the present invention.
Figure 2B:
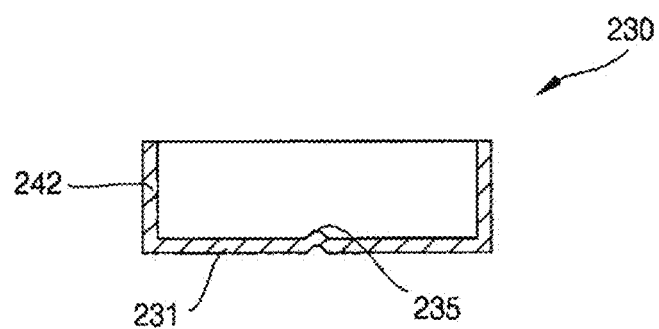

FIG. 2a is a perspective diagram illustrating a can for a cylindrical lithium rechargeable battery according to one embodiment, and FIG. 2b is a cross-sectional diagram of the can taken along line A-A, in FIG. 2a.

Referring to FIGS. 2a and 2b, a can 230 for a cylindrical lithium rechargeable battery includes a surface plate 242 and a lower plate 231, and has a cylindrical shape. Further, the surface plate 242 has outer and inner cylindrical surfaces which form two approximately concentric cylinders, and the lower plate 231 has a first surface facing the surface plate 242, and a second surface facing away from the surface plate. The first and second surfaces are approximately parallel to each other.

The can 230 can comprise a protrusion 235, or a number of protrusions 235. The protrusion 235 protrudes from the first surface of the lower plate 231. The can 230 comprises an opening 236 at an upper portion of the can 230. An electrode assembly is inserted, and an electrolyte solution is injected, into the can through the opening 236. A lower insulation plate may be inserted adjacent to the top surface of the lower plate 231. The lower insulation plate is to insulate the electrode assembly from the can 230. After inserting the electrode assembly, a beading portion is formed on the upper portion of the can 230, so that the electrode assembly is prevented from moving inside the can 230. A cap assembly is seated on the beading portion to seal the opening 236. After inserting the cap assembly, a clipping portion is formed to seal a battery. An upper insulation plate may be inserted between an upper end of the electrode assembly and the cap assembly, to insulate the electrode and the cap assemblies.

The can 230 is made of a metal that is light and that has excellent ductility. For example, the can 230 can be made of aluminum or an alloy thereof, but is not limited thereto. The can 230 is preferably manufactured by a deep drawing method, but not limited thereto.

The protrusion 235 is formed in the middle of the lower plate 231. The protrusion 235 protrudes from the second surface toward the first surface thereof. The protrusion 235 is formed on a contact region of an anode tap and the lower plate 231, where the anode tap is welded thereto. The protrusion 235 is formed by embossing the lower plate 231.

A number of protrusions 235 can be referred to as a group 237 of protrusions. As used herein, a group refers a plurality of protrusions. The group 237 comprises at least 3 protrusions 235. When the number of the protrusions in the group 237 is less than 3, a joining region thereof with an anode tap is small, and can lead to a weaker weld with anode tap. Therefore, the anode tap can be easily separated from the group 237, by minute movements of the electrode assembly, leading to disconnection problems.

The protrusion 235 may have a vertical cross-sectional shape, for example, a circular, an ovoid, or a polygonal shape. The vertical cross-sectional shape of the protrusion 235 is not limited thereto. However, in some aspects it can be desirable to avoid a cone-shaped or pointed vertical cross-section, such as, a triangle, a pentagon, a cone, or the like. A pointed shape results in a small joining region for an anode tap, so as to substantially decrease the joining strength of a weld formed there from. Further, the protrusion 235 may have a horizontal cross-sectional shape, for example, a circular, an ovoid, or a polygonal shape, but is not limited thereto.

As show in FIG. 2A, the group 237 can be disposed in a line oriented parallel to the length of an anode tap. If a group 237 is disposed in a zigzag formation, the joining strength or a weld thereto, is altered according to the region of an anode tap the protrusions come into contact with. Some regions of the anode tap may not be particularly suitable for welding, or some of the protrusions may not come into contact with the tap, which can lead to weaker welds.

According to some embodiments, the group 237 has a length of 30% of the diameter of the lower plate 231. When the length of the group 237 is less than 30% of the diameter of the lower plate 231, a precise welding position is often required for welding of the anode tap.

The group 237 can have a diameter or width of about 1.0 mm, or less. In some embodiments, for example, when a group of protrusions is disposed in a line, the width of the group is the same as the width of an individual protrusion. When the diameter or width of the group 237 is more than 1.0 mm, the contact area thereof with an anode tap is large, and can decrease the contact resistance thereof, leading to a weaker weld. Generally, the diameter of a welding rod, and an associated welding region, is 1.0 mm, or more, it is thus the protrusion 235 is formed within a diameter or width of 1.0 mm, in order to decrease the contact area of the protrusion 235, and an anode tap.

Further, the group 237 may have a height of 0.05 to 0.2 mm. As described above, the protrusion 235 is formed within a diameter or width of 1.0 mm, so that the height thereof may be 0.05 to 0.2 mm according to the curvature and pressure level used while embossing the group 237.

Further, it is desirable that a distance between adjacent protrusions 235 of the group 237 is at least 1.0 mm. The diameter of a welding region is 1.0 mm, or more, when welding the anode tap to the protrusion 235, so that adjacent protrusions, in the group 237, are spaced at least 1.0 mm apart. The spacing increases the contact resistance, reduces the contact area of the lower plate 231 and an anode tap, and allows for a stronger weld.

Figure 3A:
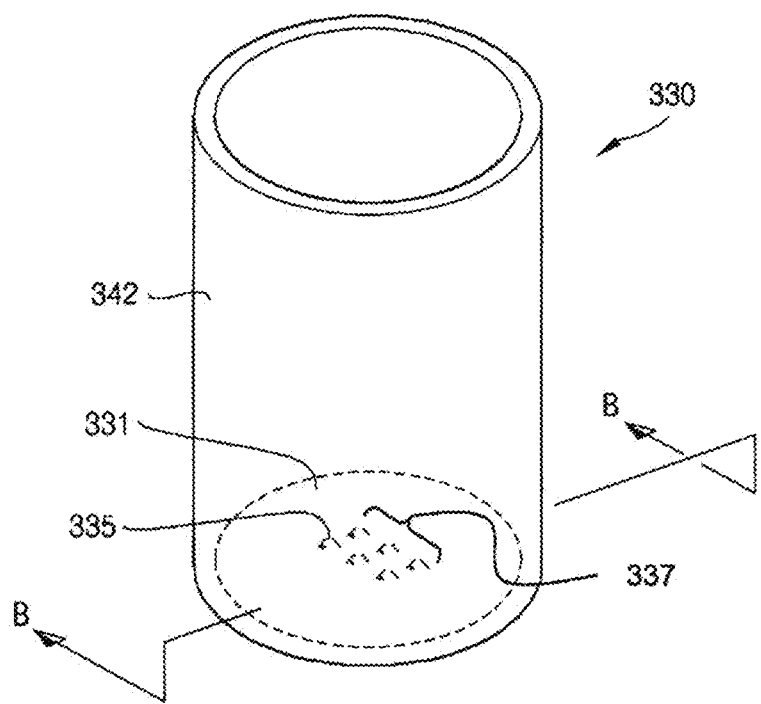
FIG. 3a is a perspective diagram illustrating a can for a cylindrical lithium rechargeable battery according to another embodiment of the present invention.
Figure 3B:
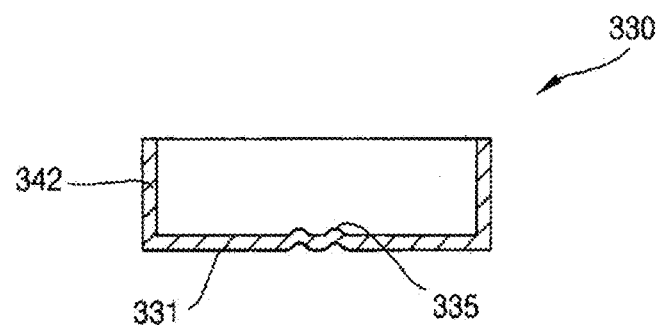

FIG. 3a is a perspective diagram illustrating a can for a cylindrical lithium rechargeable battery according to another embodiment, and FIG. 3b is a cross-sectional diagram of the can taken along B-B in FIG. 3a.

Referring to FIGS. 3a and 3b, a can 330 for a lithium rechargeable battery includes a surface plate 342 having outer and inner surfaces which form two approximately concentric cylinders, and a lower plate 331 having first and second surfaces which are approximately parallel to each other. The can 330 includes a protrusion 335 which protrudes from the second surface of the lower plate 331, toward the first surface. The protrusion 335 is formed by embossing the second surface of the lower plate 331. The can 230 can comprise a number of protrusions 335, that can be referred to as a group 337 of protrusions. The group 337 is disposed in a matrix shape having a plurality of linear arrays of protrusions 335 disposed in parallel to each other. The group 337 may comprise 2 rows as shown in FIG. 3a, or multiple rows. Further, the group 337 may comprise 3 protrusions in one linear array as shown in FIG. 3a, and one linear array may include 2 or 4 protrusions or more, but not limited thereto. The protrusions 335 of the group 337 may have a vertical cross-sectional shape that is circular, ovoid, or polygonal, and a horizontal cross-sectional shape that is circular, ovoid, or polygonal. The group 337 can have a length of 30% of the diameter of the lower plate 331, and has a diameter or width of 1.0 mm, or less. Further, the group 337 may have a height of 0.05 to 0.2 mm. Adjacent protrusions 335, of the group 337, can be spaced apart by at least 1.0 mm.

Figure 4A:
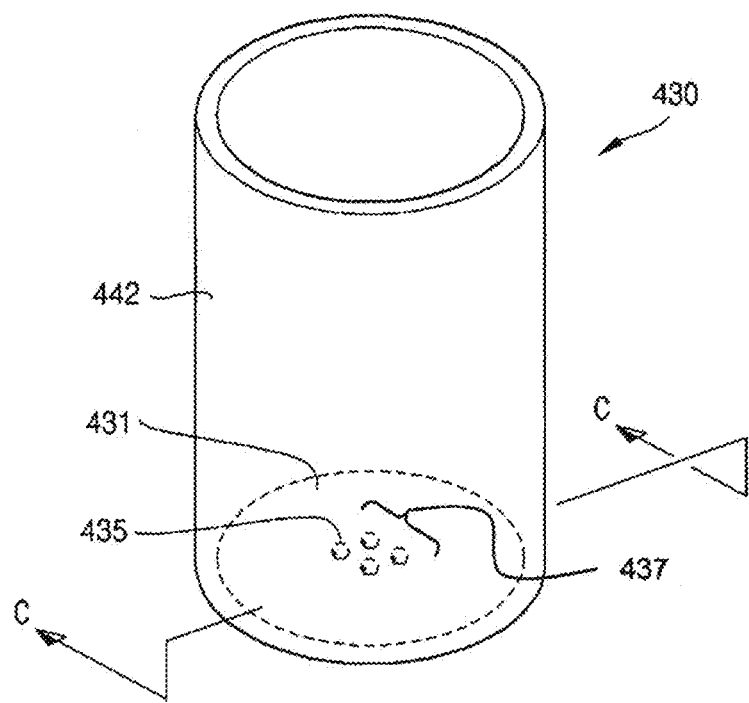
FIG. 4a is a perspective diagram illustrating a can for a cylindrical lithium rechargeable battery according to another embodiment of the present invention.
Figure 4B:
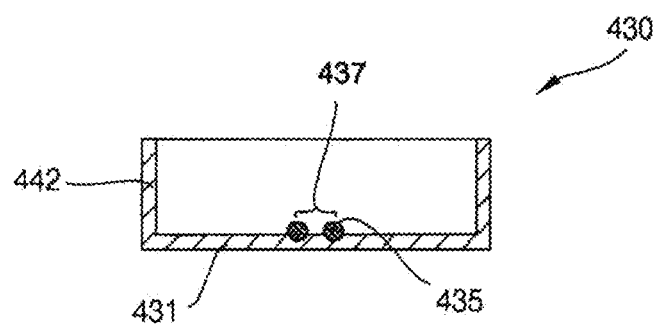

FIG. 4a is a perspective diagram illustrating a can for a cylindrical lithium rechargeable battery according to another embodiment, and FIG. 4b is a cross-sectional diagram of the can, taken along C-C, in FIG. 4a.

Referring to FIGS. 4a and 4b, a can 430 for a cylindrical lithium rechargeable battery includes a surface plate 442 having outer and inner surfaces which form two approximately concentric circles, and a lower plate 431 having first and second surfaces which are approximately parallel to each other. A group 437 of protrusions is formed in approximately the middle of the lower plate 431. The group 437 comprises 3 at least three protrusions. The protrusions of the group 437 can be conductive points 435. Conductive points 435 can comprise an electrically resistive material that is attached to the first surface of the lower plate. The conductive points can have a spherical or ovoid shape, and can be attached to the first surface of the lower plate 431 by pressing, deposition, soldering, and the like.

The group 437 may have conductive points 435 that are disposed into a linear shape, as shown in the embodiment of FIG. 2a. Further, the conductive points 435 may be disposed into a matrix shape, as shown in the embodiment of FIG. 3a. The conductive points 435 can comprise a metal or alloy having a higher electric resistance than aluminum metal. Such a metal or alloy can comprise cobalt (Co), iron (Fe), platinum (Pt), or brass. The electric resistance (p) of aluminum is $2.75 \times 10^{-3}$ $\Omega$m, while cobalt, iron, and platinum each have an electric resistance (p) of $9.7 \times 10^{-3}$ $\Omega$m, $9.8 \times 10^{-3}$ $\Omega$m and $10.6 \times 10^{-3}$ $\Omega$m, respectively. Brass has an electric resistance (p) of from $5 \times 10^{-3}$ $\Omega$m to $7 \times 10^{-3}$ $\Omega$m, according to the particular brass alloy used. However, herein, the material of the conductive points 435 is not limited thereto. If the conductive points 435 are made of a metal or alloy having a higher electric resistance than aluminum when used as a material of the can 430, the contact resistance is increased when welding the conductive points 435 to an anode tap, so that resistance welding is enhanced.

The group 437 can have a diameter of 1.0 mm, or less. Further, the group 437 can have a length of at least 30% of the diameter of the lower plate 431. The conductive points 435 have increased weld-ability to an anode tap, due to the high resistance thereof.

Figure 5A:
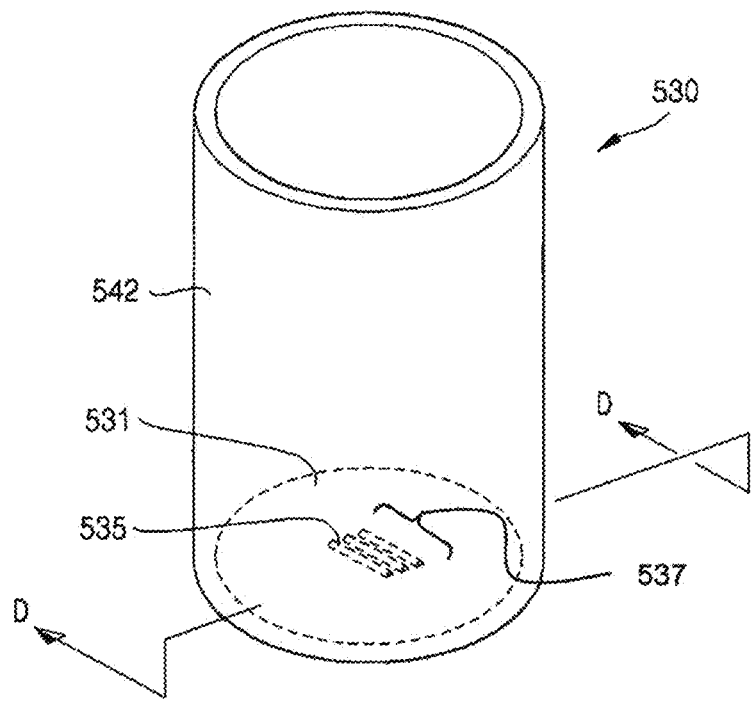
FIG. 5a is a perspective diagram illustrating a can for a cylindrical lithium rechargeable battery according to another embodiment of the present invention.
Figure 5B:
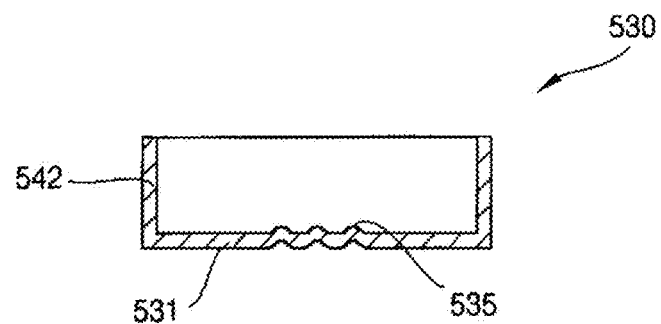

FIG. 5a is a perspective diagram illustrating a can for a cylindrical lithium rechargeable battery according to another embodiment, and FIG. 5b is a cross-sectional view of the can taken along D-D in FIG. 5a.

Referring to FIGS. 5a and 5b, a can 530 for a cylindrical lithium rechargeable battery. The can 530 includes a surface plate 542, and a lower plate 531. The can 530 includes a number of bar-shaped protrusions 535, formed by pressing a second surface of the lower plate 531. The bar-shaped protrusions 535 can be referred to collectively as a group 537 of protrusions 535. Each of the bar-shaped protrusions 535 in the group 537 is disposed in parallel at a predetermined interval. The group 537 has a length of at least 30% of the diameter of the lower plate 531 and a width of 1.0 mm, or less. The protrusions 535 of the group 537 can be spaced apart distance of at least 1.0 mm, from each other. The ends of the protrusions 535 may be semicircular, semi-ovoid, or polygonal in shape, and can have a generally rectangular horizontal cross-sectional shape.

Figure 6:
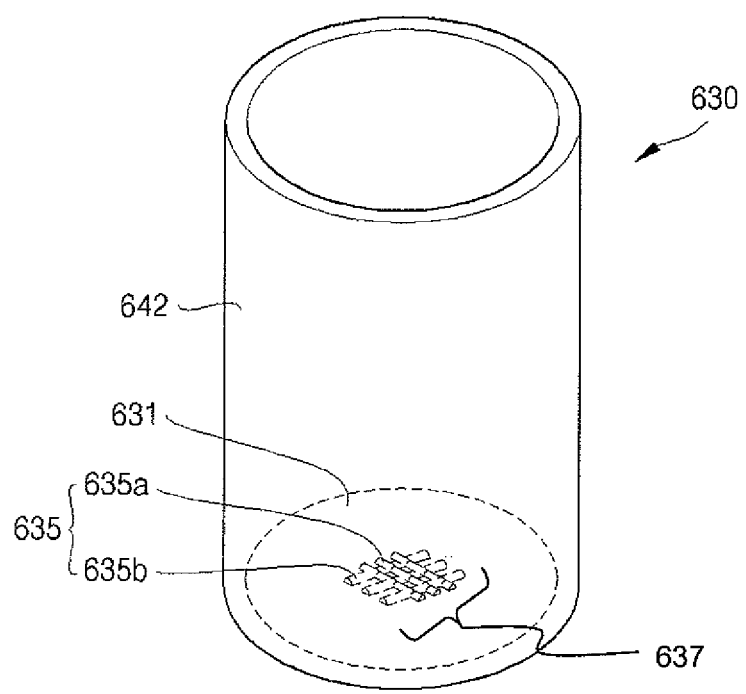
FIG. 6 is a perspective diagram illustrating a can for a cylindrical lithium rechargeable battery according to still another embodiment of the present invention.

FIG. 6 is a perspective diagram illustrating a can for a cylindrical lithium rechargeable battery according to another embodiment.

A can 630 for a cylindrical lithium rechargeable battery includes a surface plate 642, a lower plate 631, and a group 637 of protrusions 635. The group 637 comprises a plurality of overlapping protrusions 635 disposed in a matrix. The matrix can comprise a number of crosswise and lengthwise bar-shaped protrusions 635a and 635b. The crosswise and lengthwise bar-shaped protrusions 635a and 635b cross each other in order to form a predetermined angle, and may be formed into a checker-board shape. The number of each of the crosswise and lengthwise bar-shaped protrusions 635a and 635b is 3, as shown in FIG. 6, however, the present invention is not limited thereto. The group 637 has a length of at least 30% of the diameter of the lower plate 631, and a width of at least 20% of the diameter of the lower plate 631. When the area where the group 637 is formed is small, a precise welding position is often required for welding of an anode tap thereto. The length of group 637 can correspond with the length of the bar-shaped protrusion 635a, and the width can correspond to the length of the bar-shaped protrusion 635b. When welding an anode tap, the length of the anode tap is disposed in parallel with the length of the group 637.

The can for a cylindrical lithium rechargeable battery, according to an embodiment of the present invention, may be applied to the cylindrical lithium rechargeable battery illustrated in FIG. 1. However, the present invention is not limited thereto, and the can for a cylindrical lithium rechargeable battery may be applied to various lithium rechargeable batteries.

Figure 7:
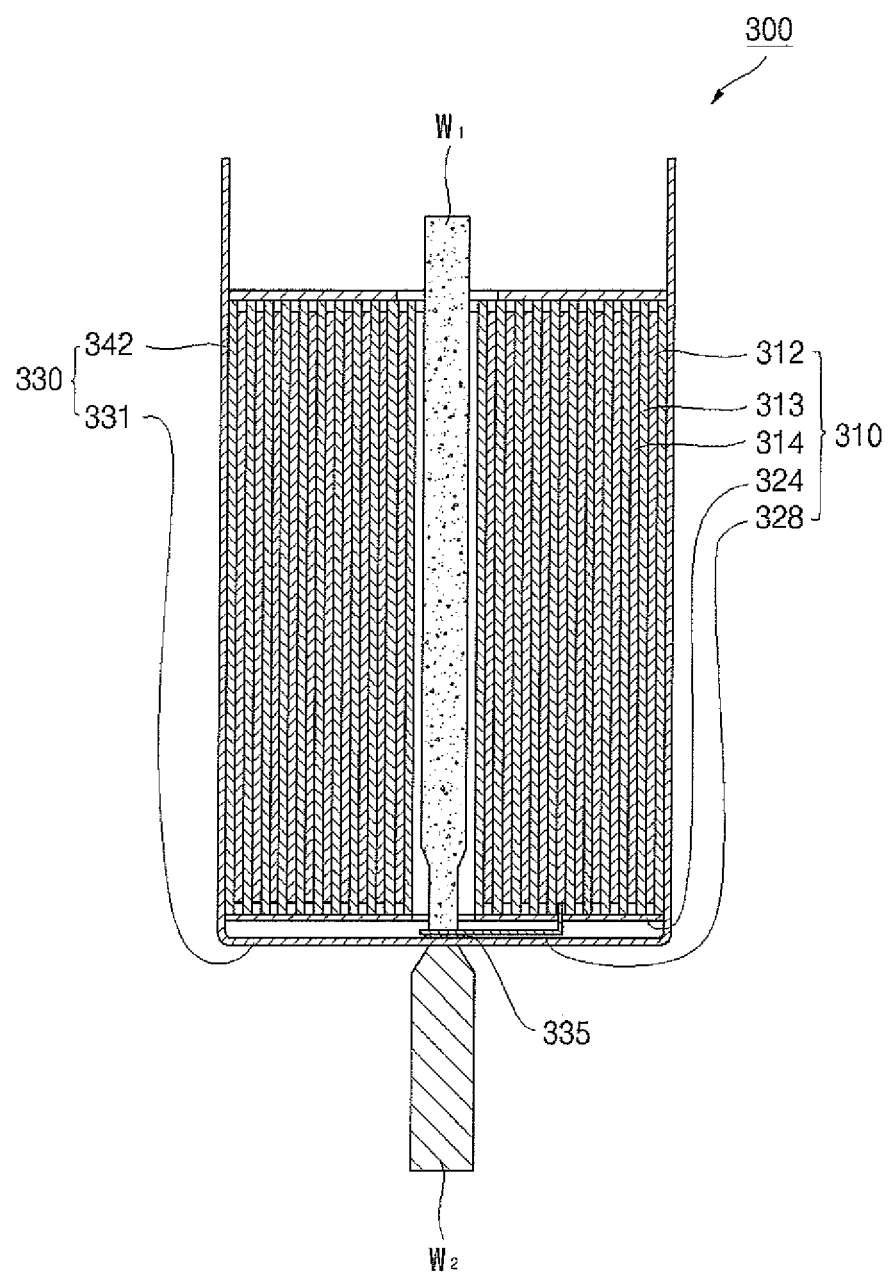
FIG. 7 is a cross-sectional diagram illustrating a welding process when the can for a cylindrical lithium rechargeable battery of FIG. 3a is applied.

Hereinafter, a process of the cylindrical lithium rechargeable battery applied with the can according to the embodiment of the present invention is described. FIG. 7 is a cross-sectional diagram illustrating a welding process for the can 330, depicted in FIG. 3a.

Referring to FIG. 7, the cylindrical lithium rechargeable battery 300 includes an electrode assembly 310 having cathode and anode plates 312 and 314, a separator 313, a cylindrical can 330, and a cap assembly (not shown). The can 330 includes a surface plate 342, a lower plate 331, and a group 337 of protrusions 335, and is formed into a generally cylindrical shape. The protrusions 335 of the group 337 can be disposed in a matrix shape. A lower insulation plate 324 is inserted into the can 330, and the electrode assembly 310 is then inserted through an opening of an upper end portion thereof. A first welding rod W1 is inserted through the middle of the electrode assembly 310, and then contacts an anode tap 328, while a second welding rod W2, contacts to the lower plate 331, of the can 330. Voltages having different polarities are applied to each of the first and second welding rods W1 and W2, and an electric current passes through the two welding rods W1 and W2, and the lower plate 331. The contact region of the anode tap 328 and the lower plate 331 demonstrates a higher contact resistance relative to other areas of the can 300, so that heat generation is focused there and welds the cathode tap 328 to the can 300. Therefore, a relatively small amount of current generates a sufficient amount of heat for welding.

As described above, the can for a cylindrical lithium rechargeable battery according to aspects of the present invention, produce the following effect.

The protrusion, or group of protrusions, formed on the lower plate of the can increase the contact resistance when contacted with an anode tap, and therefore, a relatively small amount of current generates the heat for welding, thereby increasing the weld-ability.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cylindrical lithium rechargeable battery comprising: a can comprising a cylindrical surface plate having an upper end and a lower end, and a lower plate on the lower end;
an electrode assembly in the can and comprising a cathode plate, an anode plate facing the cathode plate, and a separator located between the cathode plate and the anode plate;
a cap assembly on the upper end of the can;
an insulation plate directly contacting the separator at a first end of the electrode assembly; and
a cathode tap connecting the cathode plate to the cap assembly; and an anode tap directly coupled to the anode plate and protruding through the insulation plate and connecting the anode plate and the lower plate, wherein the lower plate comprises a group of protrusions comprising at least three protrusions contacting the anode tap, wherein each of the protrusions has a width of 1.0 mm or less to minimize a contact area of each of the protrusions with the anode tap.

2. The cylindrical lithium rechargeable battery of claim 1, wherein each of the protrusions is formed by embossing a second surface of the lower plate.

3. The cylindrical lithium rechargeable battery of claim 2, wherein each of the protrusions comprises a vertical cross-sectional shape, wherein the vertical cross-sectional shape comprises one of a circular, an ovoid, and a polygonal shape.

4. The cylindrical lithium rechargeable battery of claim 2, wherein each of the protrusions comprises a horizontal cross-sectional shape, wherein the horizontal cross-sectional shape comprises one of a circular, an ovoid, and a polygonal shape.

5. The cylindrical lithium rechargeable battery of claim 2, wherein the group of protrusions comprises a matrix shape.

6. The cylindrical lithium rechargeable battery of claim 5, wherein the group of protrusions has a length of at least 30% of the diameter of the lower plate.

7. The cylindrical lithium rechargeable battery of claim 5, wherein each of the protrusions has a height of from 0.05 to 0.2 mm.

8. The cylindrical lithium rechargeable battery of claim 5, wherein a distance between adjacent protrusions is at least 1.0 mm.

9. The cylindrical lithium rechargeable battery of claim 1, wherein the protrusions are conductive points disposed upon a first surface of the lower plate.

10. The cylindrical lithium rechargeable battery of claim 9, wherein the conductive points comprise one of a metal and a metal alloy, having a higher electric resistance than aluminum metal.

11. The cylindrical lithium rechargeable battery of claim 10, wherein the conductive points comprise one of cobalt (Co), iron (Fe), platinum (Pt), and brass.

12. The cylindrical lithium rechargeable battery of claim 9, wherein the group of protrusions has a width of 1.0 mm or less.

13. The cylindrical lithium rechargeable battery of claim 9, wherein the group of protrusions has a length of at least 30% of the diameter of the lower plate.

14. The cylindrical lithium rechargeable battery of claim 1, wherein the protrusions are bar-shaped and are embossed into a second surface of the lower plate.

15. The cylindrical lithium rechargeable battery of claim 14, wherein the bar-shaped protrusions are oriented parallel to each other.

16. The cylindrical lithium rechargeable battery of claim 15, wherein each bar-shaped protrusion has a length of at least 30% of the diameter of the lower plate.

17. The cylindrical lithium rechargeable battery of claim 15, wherein each bar-shaped protrusion has a width of 1.0 mm or less.

18. The cylindrical lithium rechargeable battery of claim 15, wherein each bar-shaped protrusion is disposed at least 1.0 mm from an adjacent bar-shaped protrusion.

19. The cylindrical lithium rechargeable battery of claim 14, wherein the bar-shaped protrusions are arranged in a matrix shape.

20. The cylindrical lithium rechargeable battery of claim 19, wherein the matrix has a width of at least 20% of the diameter of the lower plate.

21. The cylindrical lithium rechargeable battery of claim 14, wherein the protrusions are located in approximately the middle of the lower plate.

* * * * *

UNITED STATES PATENT AND TRADEMARK OFFICE
CERTIFICATE OF CORRECTION

| | | |
|---|---|---|
| PATENT NO. | : 8,551,645 B2 | Page 1 of 1 |
| APPLICATION NO. | : 11/676086 | |
| DATED | : October 8, 2013 | |
| INVENTOR(S) | : Yooeup Hyung et al. | |

It is certified that error appears in the above-identified patent and that said Letters Patent is hereby corrected as shown below:

On the Title Page:

Item (57) Abstract, line 4    Delete "facing to each",
                              Insert --facing each--

Item (57) Abstract, line 9    Delete "has surface",
                              Insert --has a surface--

Signed and Sealed this
Third Day of February, 2015

Michelle K. Lee
*Deputy Director of the United States Patent and Trademark Office*